US009508237B1

(12) United States Patent
Mercado et al.

(10) Patent No.: US 9,508,237 B1
(45) Date of Patent: Nov. 29, 2016

(54) PERSONAL ELECTRICAL INJURY PROTECTION DEVICE

(71) Applicants: Eusebio Mercado, Killeen, TX (US); Rafael Castillo, Killeen, TX (US)

(72) Inventors: Eusebio Mercado, Killeen, TX (US); Rafael Castillo, Killeen, TX (US)

( * ) Notice: Subject to any disclaimer, the term of this patent is extended or adjusted under 35 U.S.C. 154(b) by 206 days.

(21) Appl. No.: 14/501,309

(22) Filed: Sep. 30, 2014

(51) Int. Cl.
*G08B 7/06* (2006.01)
*H02H 5/12* (2006.01)

(52) U.S. Cl.
CPC . *G08B 7/06* (2013.01); *H02H 5/12* (2013.01)

(58) Field of Classification Search
CPC ............... G08G 7/06; G08G 13/1966; G08G 13/19619–13/19682; G08G 15/02; H02H 5/12
See application file for complete search history.

(56) References Cited

U.S. PATENT DOCUMENTS

| | | | |
|---|---|---|---|
| 3,784,842 A | 1/1974 | Kremer | |
| 4,983,954 A | 1/1991 | Huston | |
| D406,067 S | 2/1999 | Bouban | |
| 5,892,447 A * | 4/1999 | Wilkinson | G08B 21/0286 340/407.1 |
| 6,175,308 B1 * | 1/2001 | Tallman | B60R 25/102 340/426.2 |
| 6,600,426 B1 | 7/2003 | Sacks | |
| 6,897,783 B2 | 5/2005 | Zeng | |
| 6,979,813 B2 | 12/2005 | Avril | |
| 2002/0057365 A1 * | 5/2002 | Brown | G08B 13/19619 348/552 |
| 2003/0011484 A1 * | 1/2003 | Zeng | H02H 5/12 340/686.6 |
| 2004/0137959 A1 * | 7/2004 | Salzhauer | G08B 1/08 455/567 |
| 2005/0018044 A1 * | 1/2005 | Brown | G08B 13/19619 348/143 |
| 2005/0264427 A1 * | 12/2005 | Zeng | H02H 5/12 340/635 |
| 2006/0084419 A1 * | 4/2006 | Rocamora | G08C 17/02 455/419 |
| 2006/0087783 A1 * | 4/2006 | Holley | H01H 9/168 361/81 |
| 2006/0109599 A1 * | 5/2006 | Holley | H01H 9/168 361/64 |
| 2008/0024265 A1 | 1/2008 | Jones | |
| 2008/0085679 A1 * | 4/2008 | Fettig | H04B 5/06 455/41.2 |
| 2009/0066504 A1 * | 3/2009 | Breier | G08B 5/002 340/539.13 |
| 2012/0064492 A1 * | 3/2012 | Pearce | A61N 1/0484 434/22 |
| 2012/0212339 A1 * | 8/2012 | Goldblatt | G08B 25/016 340/539.11 |
| 2013/0021163 A1 * | 1/2013 | Watford | H02H 3/046 340/638 |

* cited by examiner

*Primary Examiner* — Amine Benlagsir
*Assistant Examiner* — Orlando Bousono

(57) ABSTRACT

The personal electrical injury protection device includes a first transmitter, a first receiver, and a second receiver. The first transmitter is adapted to be worn on an end user. The first transmitter is in wired connection with at least one electrical sensor. The at least one electrical sensor is adapted to be attached to a limb of said end user, and is able to detect a change in voltage, and upon doing so shall signal the first transmitter. The first receiver is in wireless communication with the first transmitter, and includes a speaker, and at least one light. The second receiver is adapted to turn off the main circuit breaker in order to stop electricity to be transmitted to all applicable circuits, and of which an end user has come into contact.

5 Claims, 4 Drawing Sheets

PERSONAL ELECTRICAL INJURY PROTECTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical injury protection devices, more specifically, a device that is able to operate a kill switch on an electrical panel in order to prevent or limit an electrical shock to a person coming into contact with an electrical wire elsewhere of said electrical panel.

SUMMARY OF THE INVENTION

An embodiment of the disclosure meets the needs presented above by generally comprising a first transmitter that is adapted to be worn on an end user. The first transmitter is in wired connection with at least one electrical sensor. The at least one electrical sensor is adapted to be attached to a limb of said end user, and is able to detect a change in voltage, and upon doing so shall signal the first transmitter. A first receiver is in wireless communication with the first transmitter, and includes a speaker, and at least one light. The first receiver is able to emit an audible and/or visual alarm upon receipt of a signal from the first transmitter in order to alarm others as to the electrical shock said end user has received. A second receiver is also in wireless communication with the first transmitter. The second receiver is adapted to be in mechanical connection with a main circuit breaker in order to trip or turn off the main circuit breaker upon receipt of a signal from said first transmitter. The second receiver is adapted to turn off the main circuit breaker in order to stop electricity to be transmitted to all applicable circuits, and of which an end user has come into contact.

These together with additional objects, features and advantages of the personal electrical injury protection device will be readily apparent to those of ordinary skill in the art upon reading the following detailed description of presently preferred, but nonetheless illustrative, embodiments of the personal electrical injury protection device when taken in conjunction with the accompanying drawings.

In this respect, before explaining the current embodiments of the personal electrical injury protection device in detail, it is to be understood that the personal electrical injury protection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal electrical injury protection device.

It is therefore important that the claims be regarded as including such equivalent construction insofar as they do not depart from the spirit and scope of the personal electrical injury protection device. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
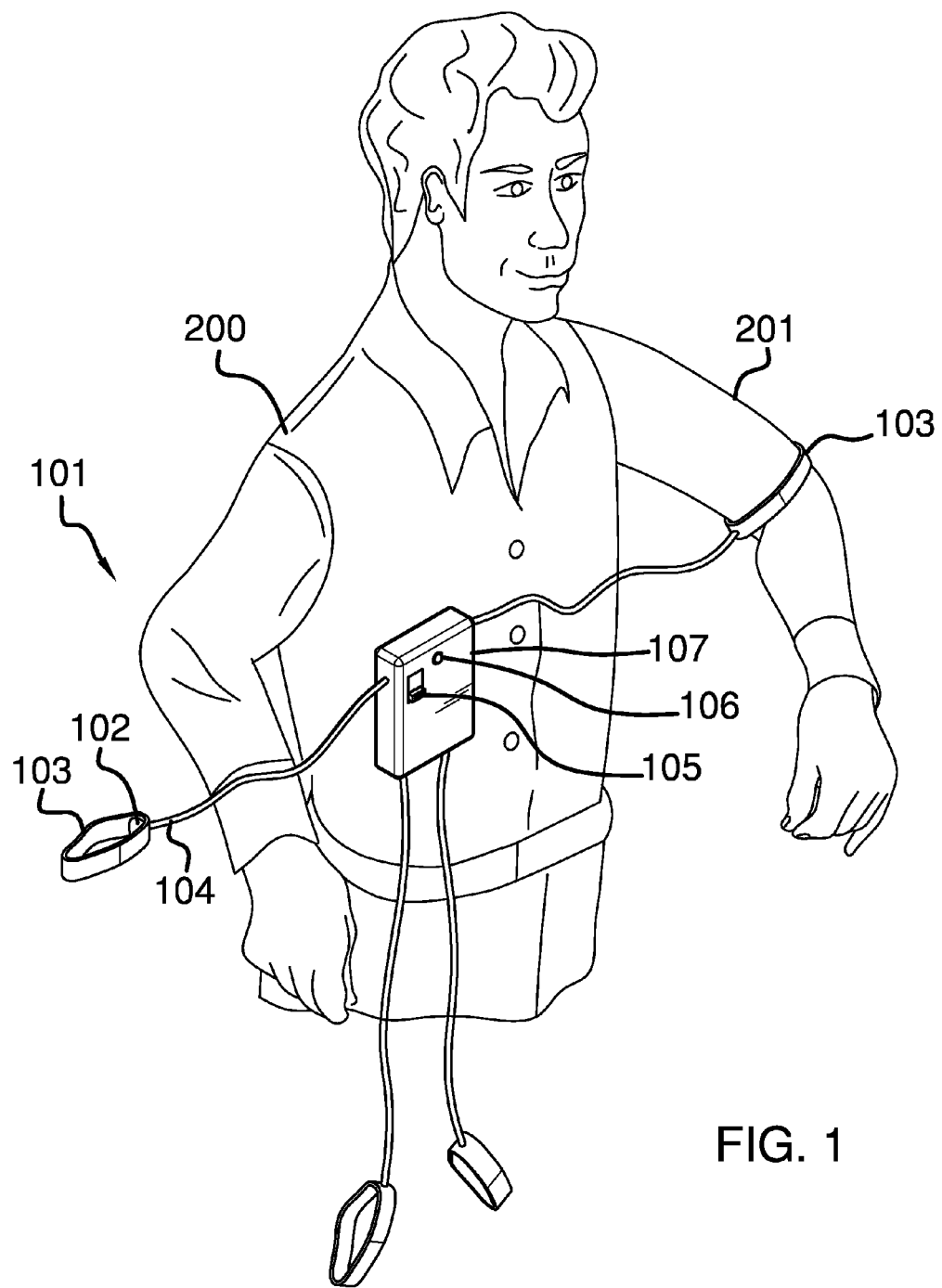
FIG. 1 is a perspective view of an embodiment of the disclosure.
Figure 2:
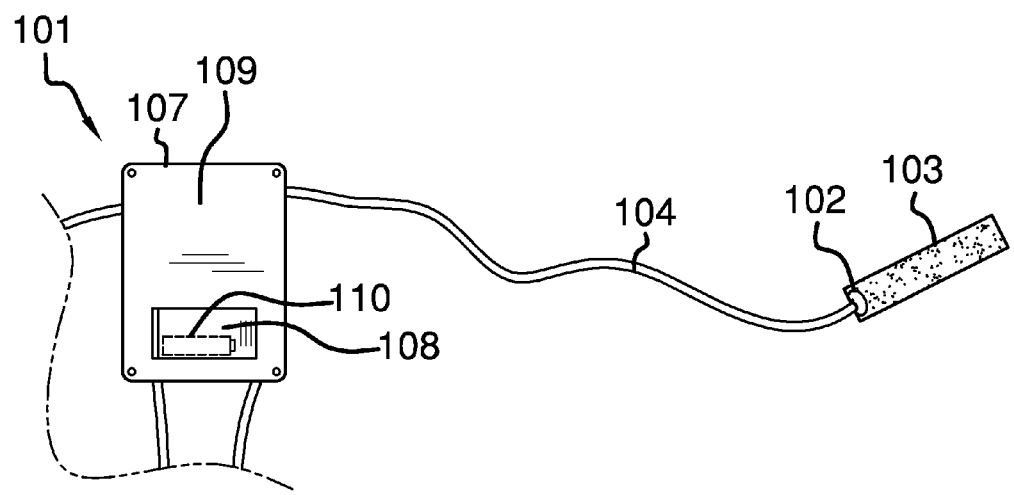
FIG. 2 is a detailed back view of an embodiment of the disclosure.
Figure 3:
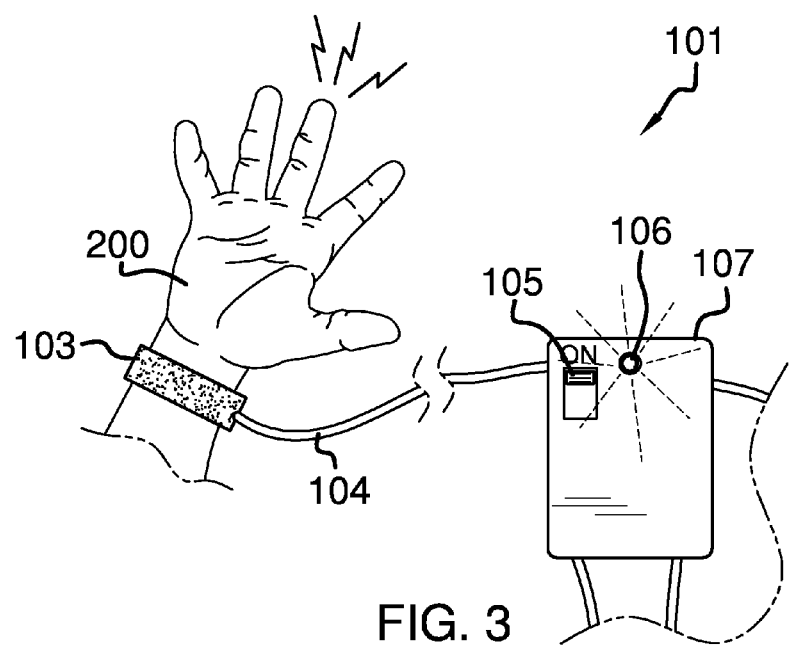
FIG. 3 is a detailed front view of an embodiment of the disclosure.
Figure 4:
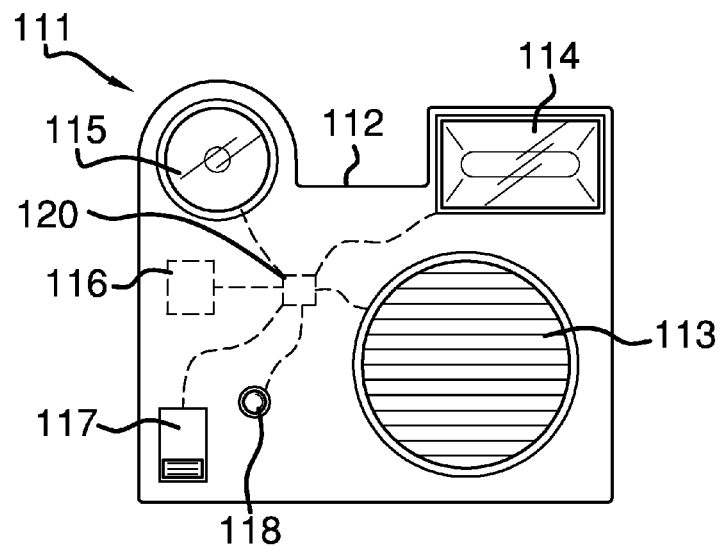
FIG. 4 is a front view of a component of an embodiment of the disclosure.
Figure 5:
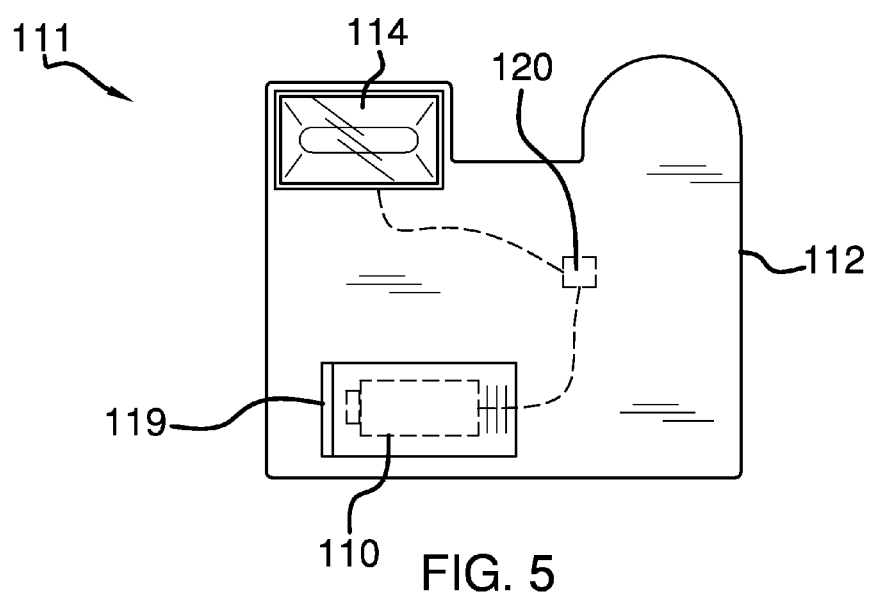
FIG. 5 is a rear view of a component of an embodiment of the disclosure.
Figure 6:
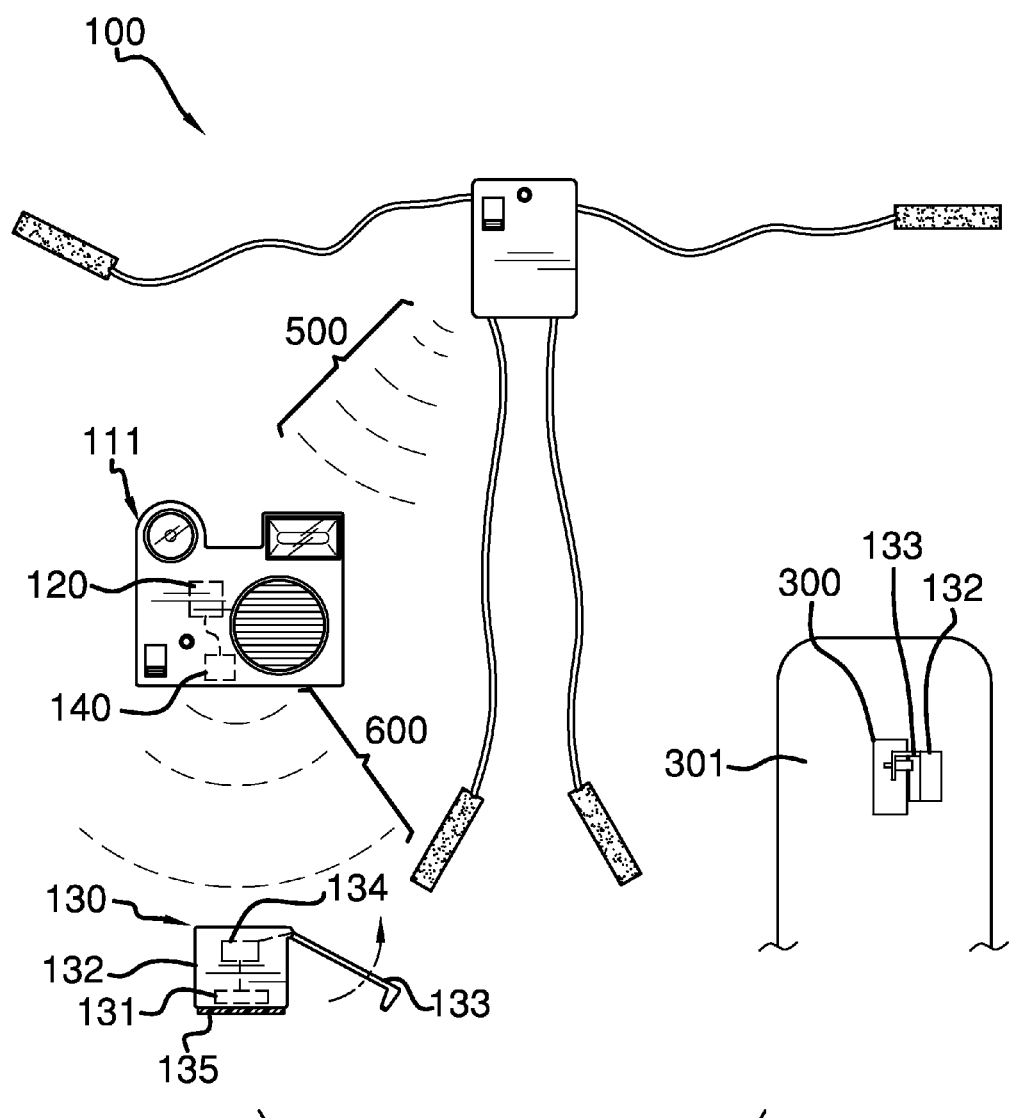
FIG. 6 is a view of all componentry associated with an embodiment of the disclosure.

As best illustrated in FIGS. 1 through 6, the personal electrical injury protection device 100 (hereinafter invention) generally comprises a first transmitter 101 that is adapted to be worn on an end user 200. The first transmitter 101 is in wired connection with at least one electrical sensor 102. The at least one electrical sensor 102 is adapted to be attached to a limb 201 of said end user 200, and is able to detect a change in voltage, and upon doing so shall signal the first transmitter 101.

The at least one electrical sensor 102 includes a strap member 103 that is adapted to wrap around the limb 201 of the end user 200 in order to secure the at least one electrical sensor 102 thereto. A wire 104 extends from the at least one electrical sensor 102 to the first transmitter 101. The first transmitter 101 includes an on/off switch 105 and a light indicator 106. The first transmitter 101 is further defined with a first housing 107 that includes the on/off switch 105, the light indicator 106, and from which the wire 104 extends to the at least one electrical sensor 102. The first housing 107 includes a battery compartment 108 on a rear first housing surface 109. The battery compartment 108 houses at least one battery 110 therein, and which is used to provide electrical needs for the first transmitter 101.

The invention 100 includes a first receiver 111. The first receiver 111 is in wireless communication with the first transmitter 101. Moreover, the first receiver 111 is able to generate an audible and/or visual alarm upon detection of a first wireless signal 500 from the first transmitter 101. In other words, the function of the first receiver 111 is to emit an alarm to other persons in the general vicinity that the end user 200 has incurred an electrical shock. As a side note, the invention 100 is ideally suited for use with electricians, electrical engineers, and other personnel that work with electrical circuits and electrical componentry.

The first receiver 111 is further defined with a first receiver housing 112 that includes a speaker 113, a strobe light 114, a flashlight 115, a first wireless receiver 116, a first on/off switch 117, a first light indicator 118, and a first battery compartment 119. The first wireless receiver 116 is located inside of the first receiver housing 112. The first battery compartment 119 houses at least one battery 110 therein. The at least one battery 110 is used to provide the electrical needs of the first receiver 111. The first receiver 111 also includes a first central processing unit 120 that is inside of the first receiver housing 112. The first central processing unit 120 is in wired communication with the speaker 113, the strobe light 114, the flashlight 115, the first wireless receiver 116, the first on/off switch 117, the first light indicator 118, and the at least one battery 110.

The invention 100 includes a second receiver 130 that is also in wireless communication with a third transmitter 140. The third transmitter 140 is located in the first receiver 111. The third transmitter 140 is in wired communication with the first central processing unit 120, and communicates from the first receiver 111 over to the second receiver 130.

The second receiver 130 includes a second wireless receiver 131 that detects a second wireless signal 600 generated from the first transmitter 101. The second receiver 130 includes a second receiver housing 132 that houses the second wireless receiver 131. The second receiver 130 includes a breaker armature 133 that is rotatably engaged with respect to the second receiver housing 132. The breaker armature 133 is mechanically rotated via a servomotor 134 located inside of the second receiver housing 132.

The breaker armature 133 is adapted to rotate a main breaker 300 of an electrical panel 301. The use of the second receiver 130 is to turn off all electrical power at the electrical panel 301 via the breaker armature 133. The second receiver housing 132 includes a magnetic member 135 that is adapted to secure the second receiver housing 132 against the electrical panel 301.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A personal electrical injury protection device comprising:
   a first transmitter that is adapted to detect a voltage surge on an end user;
   the first transmitter is in wireless communication with a first receiver that emits an audible and/or visible alarm;
   a second receiver is in wireless communication with said first receiver;
   said second receiver is adapted to turn off a main breaker of an electrical panel;
   wherein the first transmitter is in wired connection with at least one electrical sensor; wherein the at least one electrical sensor is adapted to be attached to a limb of said end user, and is able to detect a change in voltage, and upon doing so shall signal the first transmitter;
   wherein the at least one electrical sensor includes a strap member that is adapted to wrap around the limb of the end user in order to secure the at least one electrical sensor thereto;
   wherein a wire extends from the at least one electrical sensor to the first transmitter;
   wherein the first transmitter includes an on/off switch and a light indicator; wherein the first transmitter is further defined with a first housing that includes the on/off switch, the light indicator, and from which the wire extends to the at least one electrical sensor;
   wherein the first housing includes a battery compartment on a rear first housing surface; wherein the battery compartment houses at least one battery therein, and which is used to provide electrical needs for the first transmitter;
   wherein the first receiver is in wireless communication with the first transmitter; wherein the first receiver is able to generate an audible and/or visual alarm upon detection of a first wireless signal from the first transmitter;
   wherein the first receiver is further defined with a first receiver housing that includes a speaker, a strobe light, a flashlight, a first wireless receiver, a first on/off switch, a first light indicator, and a first battery compartment;
   wherein the first wireless receiver is located inside of the first receiver housing;
   wherein the first battery compartment houses another at least one battery therein;
   wherein the at least one battery is used to provide the electrical needs of the first receiver;
   wherein the first receiver also includes a first central processing unit that is inside of the first receiver housing;
   wherein the first central processing unit is in wired communication with the speaker, the strobe light, the flashlight, the first wireless receiver, the first on/off switch, the first light indicator, and the another at least one battery;
   wherein the second receiver is in wireless communication with a second transmitter; wherein the second transmitter is located in the first receiver; wherein the second transmitter is in wired communication with the first central processing unit, and communicates from the first receiver over to the second receiver;

wherein the second receiver includes a second wireless receiver that detects a second wireless signal generated from the first transmitter;

wherein the second receiver includes a second receiver housing that houses the second wireless receiver;

wherein the second receiver includes a breaker armature that is rotatably engaged with respect to the second receiver housing;

wherein the breaker armature is mechanically rotated via a servomotor located inside of the second receiver housing.

2. The personal electrical injury protection device according to claim 1 wherein the breaker armature is adapted to rotate said main breaker of said electrical panel; wherein the use of the second receiver is to turn off all electrical power at the electrical panel via the breaker armature.

3. The personal electrical injury protection device according to claim 2 wherein the second receiver housing includes a magnetic member that is adapted to secure the second receiver housing against the electrical panel.

4. A personal electrical injury protection device comprising:

a first transmitter that is adapted to detect a voltage surge on an end user;

the first transmitter is in wireless communication with a first receiver that emits an audible and/or visible alarm;

a second receiver is in wireless communication with said first receiver;

said second receiver is adapted to turn off a main breaker of an electrical panel;

wherein the first transmitter is in wired connection with at least one electrical sensor; wherein the at least one electrical sensor is adapted to be attached to a limb of said end user, and is able to detect a change in voltage, and upon doing so shall signal the first transmitter;

wherein the at least one electrical sensor includes a strap member that is adapted to wrap around the limb of the end user in order to secure the at least one electrical sensor thereto; wherein a wire extends from the at least one electrical sensor to the first transmitter;

wherein the first transmitter includes an on/off switch and a light indicator; wherein the first transmitter is further defined with a first housing that includes the on/off switch, the light indicator, and from which the wire extends to the at least one electrical sensor; wherein the first housing includes a battery compartment on a rear first housing surface; wherein the battery compartment houses at least one battery therein, and which is used to provide electrical needs for the first transmitter;

wherein the first receiver is in wireless communication with the first transmitter; wherein the first receiver is able to generate an audible and/or visual alarm upon detection of a first wireless signal from the first transmitter; wherein the first receiver is further defined with a first receiver housing that includes a speaker, a strobe light, a flashlight, a first wireless receiver, a first on/off switch, a first light indicator, and a first battery compartment;

wherein the first wireless receiver is located inside of the first receiver housing; wherein the first battery compartment houses another at least one battery therein; wherein the at least one battery is used to provide the electrical needs of the first receiver; wherein the first receiver also includes a first central processing unit that is inside of the first receiver housing; wherein the first central processing unit is in wired communication with the speaker, the strobe light, the flashlight, the first wireless receiver, the first on/off switch, the first light indicator, and the another at least one battery;

wherein the second receiver is in wireless communication with a second transmitter; wherein the second transmitter is located in the first receiver;

wherein the second transmitter is in wired communication with the first central processing unit, and communicates from the first receiver over to the second receiver;

wherein the second receiver includes a second wireless receiver that detects a second wireless signal generated from the first transmitter;

wherein the second receiver includes a second receiver housing that houses the second wireless receiver; wherein the second receiver includes a breaker armature that is rotatably engaged with respect to the second receiver housing;

wherein the breaker armature is mechanically rotated via a servomotor located inside of the second receiver housing.

5. The personal electrical injury protection device according to claim 4 wherein the breaker armature is adapted to rotate said main breaker of said electrical panel; wherein the use of the second receiver is to turn off all electrical power at the electrical panel via the breaker armature; wherein the second receiver housing includes a magnetic member that is adapted to secure the second receiver housing against the electrical panel.

* * * * *